Figure 1:
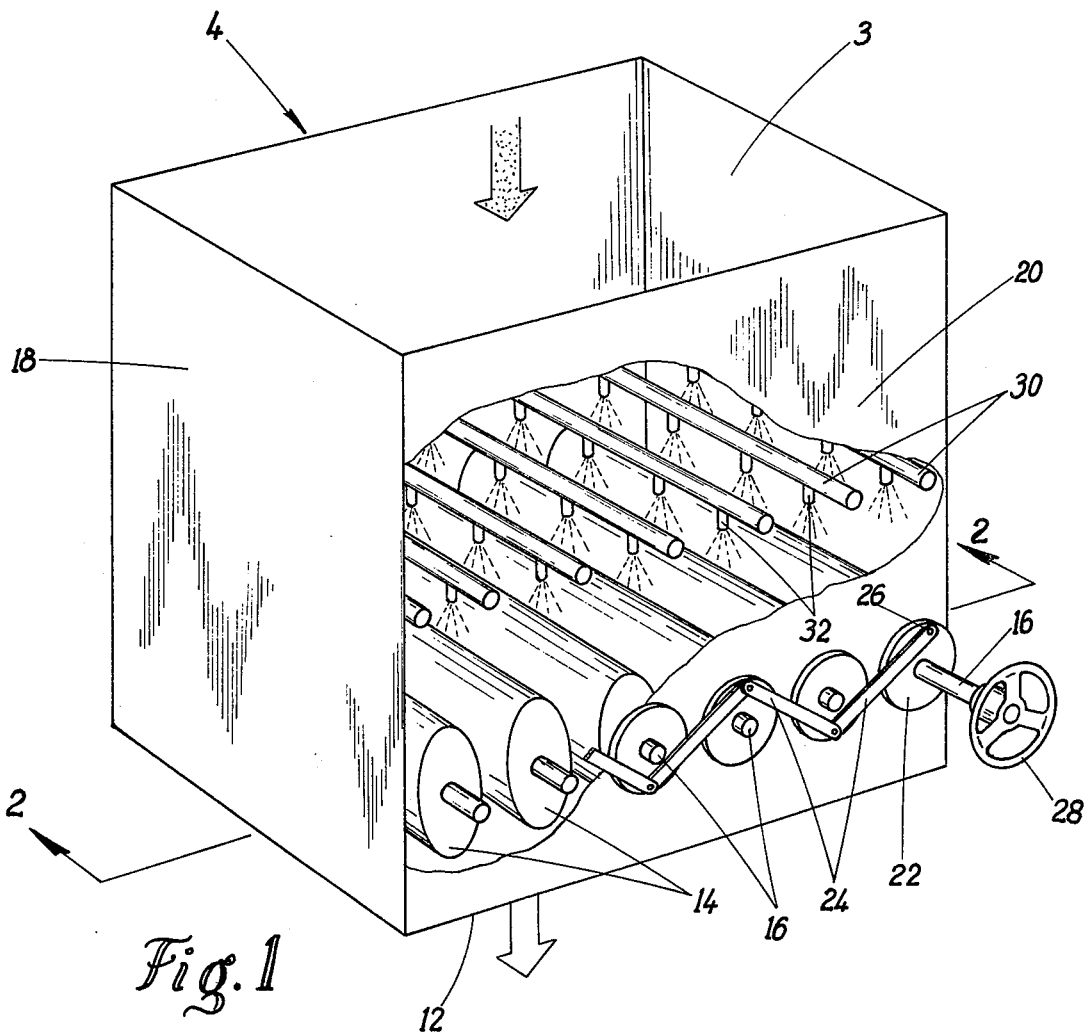

United States Patent [19]
Dahlem

[11] 3,976,455
[45] Aug. 24, 1976

[54] APPARATUS FOR CLEANING A DIRTY GAS STREAM

[75] Inventor: Francis E. Dahlem, Louisville, Ky.

[73] Assignee: American Air Filter Company, Inc., Louisville, Ky.

[22] Filed: May 6, 1975

[21] Appl. No.: 575,007

[52] U.S. Cl. ............................. 55/226; 261/44 R; 261/109; 261/111; 261/DIG. 54
[51] Int. Cl.² ........................................ B01D 47/10
[58] Field of Search ..................... 55/226, 230, 241; 261/DIG. 54, 44 R, 109, 111

[56] References Cited
UNITED STATES PATENTS

| | | | |
|---|---|---|---|
| 3,069,146 | 12/1962 | MacNeill | 261/44 R |
| 3,284,064 | 11/1966 | Kolm et al. | 261/DIG. 54 X |
| 3,339,344 | 9/1967 | Pallinger | 261/DIG. 54 X |
| 3,347,024 | 10/1967 | Dock et al. | 55/241 |
| 3,488,039 | 1/1970 | Ekman | 55/241 X |
| 3,584,440 | 6/1971 | Vigil | 261/DIG. 54 X |
| 3,591,947 | 7/1971 | Sexton | 55/226 X |
| 3,726,064 | 4/1973 | Rowley | 55/241 |
| 3,730,499 | 5/1973 | Jonakin | 55/241 X |
| 3,785,626 | 1/1974 | Bradley, Jr. et al. | 55/226 X |
| 3,841,061 | 10/1974 | Pike | 261/DIG. 54 X |

Primary Examiner—Frank W. Lutter
Assistant Examiner—Kathleen J. Prunner

[57] ABSTRACT

An apparatus for cleaning a dirty gas stream including a scrubber throat therein, the scrubber including a plurality of elongated baffles arranged in parallel and pivotally disposed for rotational movement therein, adjacent baffles being disposed to rotate in opposite directions thereby increasing or decreasing the cross-sectional flow through area with alternating converging and diverging flow through openings.

3 Claims, 2 Drawing Figures

U.S. Patent    Aug. 24, 1976    3,976,455

APPARATUS FOR CLEANING A DIRTY GAS STREAM

BACKGROUND OF THE INVENTION

This invention relates to an apparatus for cleaning a dirty gas stream and more particularly to a wet scrubber having a new, useful, and unobvious scrubber baffle arrangement therein.

Many different types of wet scrubbers for cleaning dirty gas streams are known where a wash scrubbing solution is sprayed into the gas stream with the liquid droplets from the scrubbing solution colliding with the dirty particulate matter in the gas stream and thereby removing the particulate matter from the gas stream by means of absorption and agglomeration. Scrubbing of the gas in this manner requires a large consumption of energy as well as a large amount of scrubbing solution. Also, the flow rate of the dirty gas stream entering and leaving the wet scrubber may vary thereby changing the gas velocity in the scrubber, this change in velocity in turn reducing or increasing the pressure drop across the scrubber section of the wet scrubbing device. Thus, many types of scrubbing sections have been devised in order to maintain the pressure drop in the section at predetermined values, one of the most common being a venturi scrubbing device. However, in most of these known methods and apparatuses of the prior art, the amount of scrubbing solution and the size of the cross-section of the scrubbing section are not always adapted to the particular gas throughput.

SUMMARY OF THE INVENTION

In the present invention, it is recognized that it is desirable to provide for a wet scrubber an adjustable baffle structure which is capable of adjusting the scrubbing area of the gas scrubbing device. It is further recognized that it is desirable to provide a wet scrubber device including means therein for reducing unnecessary pressure losses. Also, it is an object of the invention to provide a large scrubbing area in a compact housing for large air volumes.

Various other features of the present invention will become obvious to those skilled in the art upon reading the disclosure set forth hereinafter.

More particularly, the present invention provides an apparatus for cleaning a dirty gas stream comprising: a housing having a flow through gas inlet and a flow through gas outlet with a scrubbing section disposed therebetween, the scrubbing section including a plurality of flow restrictive baffle members in parallel extending transversely of the housing, the baffle members having cross-sectional dimensional areas wherein one dimension is greater than the other dimension, the baffle members being eccentrically pivotally disposed for rotational movement, adjacent baffles being disposed to rotate in opposite directions; and, means for spraying a scrubbing solution into the gas stream between the gas inlet and the scrubbing section.

It is to be understood that the description of the examples of the present invention given hereinafter are not by way of limitation. Various modifications within the scope of the present invention will occur to those skilled in the art upon reading the disclosure set forth hereinafter.

Figure 2:
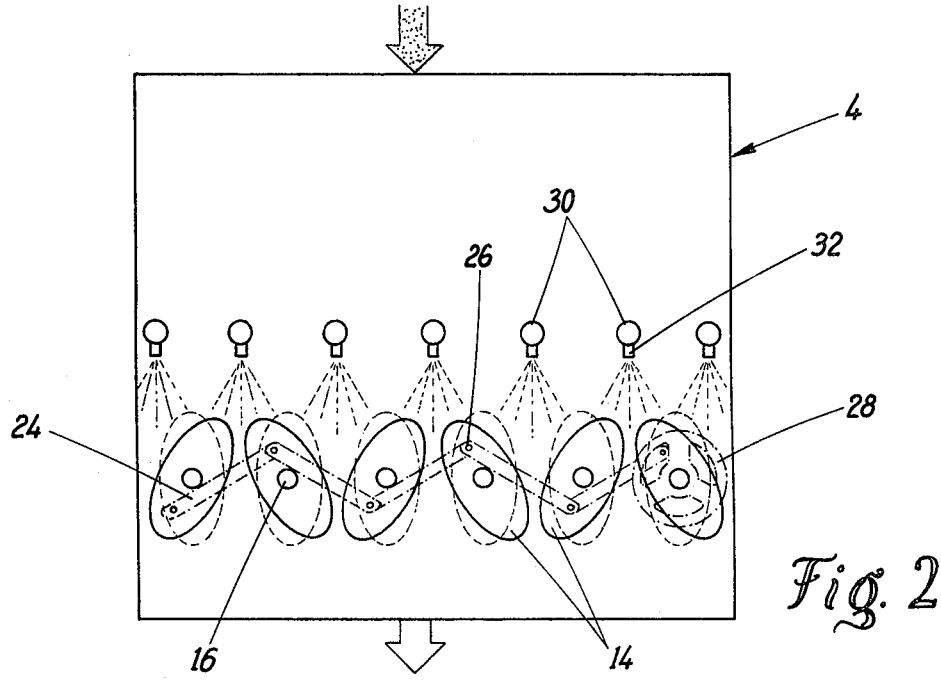

Referring to the drawing:

FIG. 1 is a perspective view with portions cut-away of one apparatus for cleaning a dirty gas stream of the present invention showing flow restrictive baffle members in their minimum flow restrictive position; and, FIG. 2 is a cross section of the wet scrubbing device of FIG. 1 taken along line 2—2 with the baffle members in a partially closed position.

FIG. 1 illustrates one preferred embodiment of the present invention which includes a scrubber housing 4 with a flow through inlet opening 3 and an opposed flow through outlet opening 12 therein. Opening 3 is provided through which the gas to be cleaned enters the scrubber housing, the gas being directed in a downwardly direction toward and out through outlet opening 12.

Disposed within the scrubber 4 is a plurality of flow restrictive baffle members 14 extending transversely of the scrubber, the baffle members 14 being arranged in parallel and disposed equidistant apart. Transversely extending baffle members 14 have a cross-sectional dimensional area wherein one dimension is greater than the other dimension, the greater dimension being in the same direction as the gas flow through the housing 4. As exemplified, the baffle members 14 are of elliptically shaped cross-section and mounted for rotation about their longitudinal axis. The baffle members 14 are axially mounted on shaft 16 extending parallel to the sides 18 of the housing 4 with their opposite ends extending through aligned apertures in the sides 20 of the housing 4, only one side 20 being shown. One corresponding end of each of the shafts 16 is extended beyond the wall 20 to accommodate a circular disc 22, each circular disc 22 being concentrically mounted onto the end of a shaft 16. Circular discs 22 are joined together by a plurality of flat link members 24, the flat link members being rotatably attached at selected off-center positions of the circular discs 22 as indicated by the numeral 26. A wheel 28 is attached to one of the shafts 16 for rotatably positioning the baffle members 14 thereby changing the cross-sectional flow area in the housing 4. As shown in FIG. 1, elliptically-shaped baffle members 14 are disposed in a position to obtain the maximum amount of cross sectional flow area through the housing 4 whereas in FIG. 2 the baffle members 14 are positioned in a partially closed position with alternating converging and diverging sections being defined between each pair of baffle members 14.

It will be understood that the baffle members 14 may be constructed in any desired shape having a length to width ratio, in cross-section, which is greater than one, such as the elliptically shaped members shown or plates, leafs, or other configurations. The elliptically shaped baffle members 14 shown are constructed of elliptically shaped tubes with the rod members 16 being welded to the ends thereof. Advantageously, the greater the ratio of length to width, in cross-section, of the baffle members 14 provides a minimum amount of resistance to gas flow when positioned in their fully open or their least restrictive position, as shown in FIG. 1. It is also realized that the cross-sectional shape of the housing 4 which is illustrated as being rectangular may be of any desired cross sectional shape.

In the Figures, a plurality of spray headers 30 spaced from and parallel to the transversely extending baffle members 14 are provided to introduce a scrubbing solution into the scrubber 4. Each of the spray headers 30 are spaced equidistant between the baffle members 14 with an additional header being spaced between each of the walls 18 and the adjacent baffle member 14. A plurality of spray nozzles 32 are provided in each of the spray headers 30, the spray nozzles 32 being equidistant apart along the header 30 at preselected positions to give uniform distribution of scrubber spray solution into the concurrently flowing gas stream. With this arrangement, gases are cooled prior to their contacting the baffle members 14, the gases containing sufficient moisture therein to continually wash the surfaces of the walls 18 and the baffle members 14 so that no build up of solids will occur on the surfaces thereof. The scrubbing solution may be supplied from any source since the type of solution utilized and the source from which the solution is pumped is well known in the art, particularly scrubbing solutions, tanks, and pumping mechanisms and will therefore not be described.

In the operation of the scrubbing apparatus in the preferred embodiment, dirty gases are received from a source, not shown, and enter the scrubber housing through inlet portion 3. The gases are contacted with a spray solution from spray nozzles 32, the solids in the gas stream being entrained in the scrubbing solution. The gases of the housing 4 then flow out through the outlet 12. As shown in FIG. 1, maximum cross-sectional area of flow is maintained by keeping the elliptically shaped baffle members 14 in a vertical position. However, a constant velocity of gases through the scrubbing apparatus can be maintained also at reduced gas flow rates by merely adjusting the hand wheel 28 thereby reducing the cross-sectional flow area corresponding with the reduction in flow. This constant gas flow velocity is maintained at a rate so that intimate mixing of the gas and spray solution continues to take place. It is also realized that the hand wheel 28 may be replaced by automated motor driven means with the baffle members 14 being positioned in relation to a pressure drop monitored at a preselected position in the dirty gas stream upstream of the scrubber housing 4.

It will be realized that various changes may be made to the specific embodiment shown and described without departing from the scope and spirit of the present invention.

What is claimed is:

1. An apparatus for cleaning a dirty gas stream comprising: a housing having a flow through gas inlet and a flow through gas outlet with a scrubbing section disposed therebetween, said scrubbing section including a plurality of flow restrictive baffle members in parallel extending transversely of said housing, said baffle members having cross-sectional dimensional areas wherein one dimension is greater than the other dimension with pivot points eccentrically disposed a preselected distance from a longitudinal axis of said baffle members, adjacent baffle members having opposed pivot points, said baffle members including means to rotate adjacent baffle members in opposite directions, said means to rotate being connected to said pivot points whereby movement of said baffle members defines alternating converging and diverging sections between each pair of baffle members; and, means for spraying a scrubbing solution into said gas stream between said gas inlet and said scrubbing section.

2. The apparatus of claim 1 wherein said baffle members are equidistant apart.

3. The apparatus of claim 1 wherein said baffle members are elliptically shaped.

* * * * *